(12) United States Patent
Zengerle (10) Patent No.: US 8,944,226 B2
(45) Date of Patent: Feb. 3, 2015

(54) TRANSFERRING ELECTRIC ENERGY TO A VEHICLE, USING A SYSTEM WHICH COMPRISES CONSECUTIVE SEGMENTS FOR ENERGY TRANSFER

(75) Inventor: Manfred Zengerle, Ebertsheim (DE)

(73) Assignee: Bombardier Transportation GmbH, Berlin (DE)

( * ) Notice: Subject to any disclaimer, the term of this patent is extended or adjusted under 35 U.S.C. 154(b) by 280 days.

(21) Appl. No.: 13/503,714

(22) PCT Filed: Oct. 26, 2010

(86) PCT No.: PCT/EP2010/006591
§ 371 (c)(1),
(2), (4) Date: Apr. 24, 2012

(87) PCT Pub. No.: WO2011/050960
PCT Pub. Date: May 5, 2011

(65) Prior Publication Data
US 2012/0217112 A1     Aug. 30, 2012

(30) Foreign Application Priority Data
Oct. 28, 2009  (GB) .................................. 0918942.4

(51) Int. Cl.
| | |
|---|---|
| *B60L 1/00* | (2006.01) |
| *B60M 3/04* | (2006.01) |
| *B60L 5/00* | (2006.01) |
| *H02M 1/00* | (2006.01) |
| *H02M 1/12* | (2006.01) |
| *H02M 7/5387* | (2007.01) |

(52) U.S. Cl.
CPC *B60M 3/04* (2013.01); *B60L 5/005* (2013.01); *B60L 2200/26* (2013.01); *H02M 2001/0006* (2013.01); *H02M 1/126* (2013.01); *H02M 7/5387* (2013.01)
USPC ............................................................ 191/5

(58) Field of Classification Search
USPC ................................................ 191/2–5, 22 R
See application file for complete search history.

(56) References Cited

U.S. PATENT DOCUMENTS

| | | | |
|---|---|---|---|
| 3,863,574 | A | 2/1975 | Thomas |
| 5,821,728 | A | 10/1998 | Schwind |
| 8,054,118 | B2 | 11/2011 | Wolf et al. |
| 2008/0011184 | A1 | 1/2008 | Lopatinsky et al. |
| 2008/0015756 | A1 | 1/2008 | Schmidt |

(Continued)

FOREIGN PATENT DOCUMENTS

| | | |
|---|---|---|
| CN | 1976826 A | 6/2007 |
| CN | 101395028 A | 3/2009 |
| DE | 2306292 A1 | 8/1974 |

(Continued)

*Primary Examiner* — R. J. McCarry, Jr.
(74) *Attorney, Agent, or Firm* — The Webb Law Firm (57) ABSTRACT

Disclosed is a system for transferring electric energy to a vehicle, in particular to a track bound vehicle such as a light rail vehicle. The system includes an electric conductor arrangement for producing an alternating electromagnetic field and for thereby transferring the energy to the vehicle. The electric conductor arrangement includes at least one alternating current line. Each alternating current line carries one phase of an alternating electric current. The conductor arrangement includes a plurality of consecutive segments. The segments extend along the path of travel of the, vehicle. Each segment includes one section of each of the at least one alternating current line.

15 Claims, 4 Drawing Sheets

(56) References Cited

U.S. PATENT DOCUMENTS

2008/0111184 A1 5/2008 Beintner et al.
2009/0003022 A1* 1/2009 Nunoya et al. ............... 363/78

FOREIGN PATENT DOCUMENTS

| EP | 1744443 A1 | 1/2007 |
|---|---|---|
| GB | 657035 A | 9/1951 |

* cited by examiner

TRANSFERRING ELECTRIC ENERGY TO A VEHICLE, USING A SYSTEM WHICH COMPRISES CONSECUTIVE SEGMENTS FOR ENERGY TRANSFER

BACKGROUND OF THE INVENTION

1. Field of the Invention

The invention relates to a system and a method for transferring electric energy to a vehicle, in particular to a track bound vehicle such as a light rail vehicle (e.g. a tram). The system comprises an electric conductor arrangement for producing an alternating electromagnetic field and for thereby transferring the energy to the vehicle. The conductor arrangement comprises a plurality of consecutive segments, wherein the segments extend along the path of travel of the vehicle.

2. Description of Prior Art

In particular track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to transferring electric energy to a vehicle which is not necessarily (but preferably) a track bound vehicle. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

Track bound vehicles, in particular vehicles for public passenger transport, usually comprise a current collector (alternatively a device) for mechanically and electrically contacting a line conductor along the track, such as an electric rail or an overhead line. At least one propulsion motor on board the vehicle is fed with the electrical power from the external track or line and produces mechanical propulsion force.

Trams and other local or regional trains are operated usually via overhead lines within cities. However, especially in historic parts of cities, overhead lines are undesirable. On the other hand, conductor rails in the ground or near the ground cause safety problems.

U.S. Pat. No. 5,821,728 describes an apparatus for charging batteries of a moving electric vehicle comprising a series of inductive coils for producing a magnetic field along a centerline of a roadway. The inductive coils are connected to power lines via switches that can be activated by switch activator sensors. When a sensor receives a signal from a transmitter of the vehicle, this will cause the corresponding switch to close and thereby to activate the coil.

However, since the coil produces an electromagnetic field the power supply lines are connected to an alternating voltage source. Consequently, the power supply lines permanently produce an electromagnetic field of smaller intensity than the coils, but still strong enough to interfere with any electric or electronic equipment in the surrounding.

Inductively transferring energy from the track to the vehicle, i.e. producing electromagnetic fields, is subject to restrictions regarding EMC (electromagnetic compatibility). On one hand, electromagnetic fields may interfere with other technical devices. On the other hand, people and animals should not be subjected to electromagnetic fields permanently. At least, the respective limit values for field intensity must be observed.

Alternatively, the power supply may be a DC (direct current) power supply line which may be connected to each coil via an inverter. Typically, inverters comprise a control device for controlling the operation of semiconductor switches in order to produce the alternating voltage on the AC (alternating current) side of the inverter. This control device also requires electric energy for operation.

In order to reduce the electromagnetic emission where no vehicle is driving at a time, the conductor arrangement (e.g. the arrangement comprising the coils according to U.S. Pat. No. 5,821,728) which is used to inductively transfer the energy to the vehicle can be divided into consecutive segments extending along the path of travel of the vehicle. These segments may be operated where required only. In particular, the length of each of the segments along the path of travel may be shorter than the length of a vehicle in the travel direction and the segments may be operated only if a vehicle is already occupying the respective region of the path of travel along which the segment extends. In particular, occupied by a rail vehicle means that a rail vehicle is driving on the rails along which the segment extends. Preferably, the segments are operated only if the vehicle is fully occupying the respective region of the path of travel. For example, the rail vehicle is longer (in the direction of travel) than the segment and the vehicle's front and end are driving beyond the limits of the segment, if viewed from the center of the segment. Therefore it is proposed that the segment is switched on (i.e. the alternating current through the segment is starting to flow) before a receiving device of a vehicle for receiving the transferred energy enters the region of the path of travel along which the segment extends.

If a large number of consecutive segments is provided, using a DC power supply line means that an equally large number of inverters is required. Each inverter needs to be provided with electric energy for operation. Therefore, additional equipment for conducting electric energy to the inverter's control device is required.

It is an object of the present invention to provide a system of the kind indicated above, for inductively transferring electric energy to a vehicle and to provide a method of transferring electric energy to a vehicle, which reduce the effort for providing electric energy to devices of the system which control and/or operate the generation of electromagnetic fields in order to transfer the energy to the vehicle. Furthermore, the respective limits for meeting EMC requirements shall be met.

SUMMARY OF THE INVENTION

The conductor arrangement for producing the electromagnetic field may be located in and/or under the track, for example under the surface of the ground on which the vehicle travels. However, the invention also includes the case that at least a part of the conductor arrangement is located sideways of the track, for example when the track is located in the country side or in a tunnel.

The easiest way to transmit the energy, which is needed by the segments of the conductor arrangement to produce the electromagnetic field, is using an additional power supply, wherein the power supply lines of the power supply are carrying an alternating current. Switches at the respective interfaces to the segment can be switched on to commence operating the segment. However, as mentioned above, the power supply lines also produce an electromagnetic field. This field can be shielded from the environment, e.g. by burying the power supply lines in the ground and/or by using metal shields. However, with alternating voltages having high peak voltages, shielding is less effective. In any case, metal shields increase costs and the effort of constructing and realizing the system. On the other hand, high peak voltages increase the efficiency of the power supply.

The present invention proposes an alternative way: The power supply carries a mainly constant current (i.e. a direct current) and each segment is connected to the supply line via an inverter. The alternating current which is necessary for producing the electromagnetic field in the respective segment is generated by an inverter. In particular, the inverter produces the alternating current by repeatedly switching on and off the switches, as is principally known in the art of inverters. Preferably, each inverter is placed directly at the end of a segment. In other words: the concept of the present invention is to produce the alternating current locally and preferably where and when necessary. The frequency of the alternating current which flows through the conductor arrangement may be in the range of 5 to 100 kHz, in particular in the range of 10 to 30 kHz, preferably about 20 kHz.

In particular, the system comprises a direct current (DC) power supply for conducting electric energy to the segments, wherein the direct current supply comprises a first and a second direct current line, the first direct current line being operated at a different electric potential than the second direct current line. Preferably, the direct current lines extend along the path of a travel of the vehicle. Each segment is connected to the direct current supply via at least one inverter which is adapted to invert a direct current carried by the direct current supply to an alternating current carried by the segment.

If a segment is not to be operated, the switches of the inverter are not operated, i.e. are permanently switched off. Since the supply lines mainly carry a direct current, the power supply does not produce an alternating electromagnetic field of significant intensity. Furthermore, only those segments which are switched on (i.e. which are fed by the inverter/inverters) are producing electromagnetic fields. Therefore, the EMC standards can be met easily and the losses of electric energy are reduced to a minimum. The effort for providing and operating switches as parts of inverters is not significantly higher than for providing and operating switches between alternating current supply lines and the segments. The number of switches can even be reduced.

Furthermore, using a DC power supply overcomes the disadvantage of an alternating current power supply that alternating current lines comprise an inductance which needs to be compensated, e.g. by capacities at regular intervals along the path of travel. Since the current in the DC supply lines is mainly a direct current, losses due to the inductance are nearly zero. For example, the DC supply line can be fed with electric energy in the same manner as standard DC supply lines (such as live rails) which are to be contacted by a sliding contactor of a vehicle.

Inverters for producing a three-phase alternating current (as preferred with the present invention) usually comprise three bridges connecting the DC power supply lines. Each bridge comprises two semiconductor switches (usually IGBTs or GTOs) which are connected in series to each other. The corresponding alternating current line of the bridge is connected to a point in between the two switches.

Inverters of this kind comprise drive units for driving the electric currents which are needed to control the switches. In case of IGBTs, these drive units are usually called gate drive units, since they drive the electric currents to and from the gate of the IGBT. To coordinate the operation of the drive units, an inverter control unit is provided, often called drive control unit or DCU.

These and possibly further devices (e.g. detectors for detecting the presence of a vehicle) which are required for operating the inverter and/or the segment, need to be provided with electric energy in order to operate the device or devices.

It is a basic idea of the present invention to use the DC power supply at the same time for providing electric energy to these devices. For this purpose, the DC voltage between the two lines of the DC power supply is modulated so that the DC voltage varies as a function of time. However, the peak voltage of the resulting alternating voltage is preferably much smaller than the DC voltage of the DC power supply. For example, the mean value of the voltage between the two power supply lines may be in the region of 500 to 1.000 V. On the other hand, the peak voltage of the overlaid alternating voltage may be in the range of 2 to 10 V, for example. Generally, it is preferred that the peak voltage (the difference between the highest voltage and the mean value) of the overlaid alternating voltage is equal to or less than 5%, most preferred equal to or less than 2% of the direct voltage (i.e. the difference between the mean values of the two DC lines).

In particular, the following is proposed: A system for transferring electric energy to a vehicle, in particular to a track bound vehicle such as a light rail vehicle, wherein
- the system comprises an electric conductor arrangement for producing an alternating electromagnetic field and for thereby transferring the energy to the vehicle,
- the conductor arrangement comprises a plurality of consecutive segments, wherein the segments extend along the path of travel of the vehicle,
- the system comprises a direct current supply for conducting electric energy to the segments, wherein the direct current supply comprises a first and a second direct current line, the first direct current line being operated at a different electric potential than the second direct current line,
- each segment is connected to the direct current supply via at least one inverter which is adapted to invert a direct current carried by the direct current supply to an alternating current carried by the segment,
- the system comprises a modulation device for modulating the electric potential of at least one of the first and second direct current line using a predetermined modulation frequency, thereby producing a direct voltage having an overlaid voltage alternating with the modulation frequency,
- at least some of the inverters comprise a transformer having a primary and a secondary winding, wherein the primary winding is connected to the first or second direct current line so that the direct current flows through the primary winding and wherein the secondary winding is connected to a power supply arrangement adapted to provide electric energy for operating the inverter.

Furthermore, a method of transferring electric energy to a vehicle, in particular to a track bound vehicle such as a light rail vehicle, is proposed, wherein
- an electric conductor arrangement is operated to produce an alternating electromagnetic field and for thereby transferring the energy to the vehicle,
- the conductor arrangement comprises a plurality of consecutive segments, wherein the segments extend along the path of travel of the vehicle, wherein the segments are operated separately, at least partly and/or at least occasionally, electric energy for transfer to the vehicle is conducted to the segments via a direct current supply, wherein the direct current supply comprises a first and a second direct current line, the first direct current line being operated at a different electric potential than the second direct current line, the electric energy is conducted from the direct current supply via at least one inverter to each of the segments, the inverter being operated to invert a direct current carried by the direct current supply to an alternating current carried by the segment, the electric potential of at least one of the first and second direct current lines is modulated with a predetermined modulation frequency, thereby producing a direct voltage having an overlaid voltage alternating with the modulation frequency, at least some of the inverters comprise a transformer having a primary and a secondary winding, wherein the primary winding is connected to the first or second direct current line so that the direct current flows through the primary winding and wherein the transformer is used to provide electric energy from the secondary winding for operating a control device of the inverter.

The pre-determined modulation frequency is preferably chosen so that there are no interferences with other devices within the system or in the surrounding of the system. For example, the pre-determined modulation frequency may be in the range of 500 to 1000 Hz.

As mentioned above, the first direct current line is operated at a different electric potential than the second direct current line. For example, the first direct current line may be at plus potential and the second direct current line may be at minus potential. More generally speaking, the electric potential at the first direct current line is always higher than the electric potential at the second direct current line or vice versa, although the direct voltage is modulated with the pre-determined modulation frequency. The overlaid alternating voltage has a peak value which is smaller than the difference of the mean values between the electric potentials of the first and second direct current line.

A device which can be used to produce the overlaid alternating voltage may be a transformer having a primary winding and a secondary winding. The secondary winding may be part of the first or second direct current line so that an alternating current which flows through the primary winding induces the desired modulation of the electric potential at the connections of the secondary winding.

The other transformer which is mentioned above and which is used to decouple the required electric energy for operating the inverter may be located near the inverter or may be part of a module which comprises the inverter. The alternating voltage which is induced in the secondary winding of this transformer can be used as alternating voltage source. As principally known in the art of providing energy to electric or electronic components, this alternating voltage may be connected to circuitry for conditioning the voltage or current which is needed for operating the inverter and/or other devices. Such circuitry may comprise a rectifier for producing a direct current, capacities for smoothing a direct voltage and/or at least one further transformer for producing a desired alternating voltage level. Alternatively or in addition, the circuitry may comprise other electric or electronic components.

Preferably, the electric conductor arrangement comprises three lines, each line carrying a different phase of a three-phase alternating current. However, it is also possible, that there are only two or that there are more than three phases carried by a corresponding number of alternating current lines. For example, in the case of a three-phase system, the phase shift may be 120°, as usual. In particular, each of the segments may comprise sections of each of the lines. The alternating current in each phase may be a sinusoidal or nearly sinusoidal current produced by the inverter or inverters. Alternatively, it may be a nearly rectangular current, i.e. a step function of time.

According to a first embodiment, the conductor arrangement is arranged in such a manner that at least two consecutive segments can be operated at the same time, wherein corresponding lines for carrying the same phase of the alternating current in the consecutive sections are connected in series to each other. For example, the interface between the consecutive segments may comprise a switch or an arrangement of switches which may connect or disconnect the corresponding lines. However, it is preferred that the phase lines of consecutive segments are permanently connected in series to each other and that the operation (producing an electromagnetic field) or non-operation (not producing an electromagnetic field) of the segments is controlled by operating (or by not operating) the respective inverters.

According to a second embodiment, the lines for carrying the same phase of the alternating current in the consecutive sections are not connected to each other. An advantage of this embodiment is that non-active segments do not produce electromagnetic fields at all, since they are de-coupled from active segments. An example will be described with reference to the figures.

The number of consecutive segments which are operated at the same time is not restricted to two. Rather, three or more consecutive segments can be operated at the same time, for example if a long vehicle is travelling on the path, such as a vehicle having receiving devices at different locations. In this case, it is preferred that segments are switched off only when the last receiving device has left the section of the path which corresponds to the segment.

The process of starting or stopping the operation of segments may be controlled using at least one of the phase lines of the segments. Preferably, the occupation of a respective section of the track by a vehicle may be detected, in particular by detecting a voltage and/or a current in the lines of the segment which is caused by inductive coupling of the vehicle to the lines and/or which is caused by electromagnetic fields produced by the vehicle. Correspondingly, a measurement device may be connected to at least one of the lines. Preferably, a plurality of or all of the lines of the segment is connected to a measurement device and/or to the same measurement device. The measurement device or devices is/are adapted to detect the occupation of the respective section of the track by a vehicle by detecting a voltage and/or a current in the line or a separate loop which is caused by inductive coupling of the vehicle to the line and/or which is caused by electromagnetic fields produced by the vehicle. Such a measurement device can be combined with one of the inverters and may be provided with electric energy for operation from the power supply arrangement which is connected to the secondary winding of the transformer.

Standard inverters known in the art often comprise a capacitor in order to smooth the direct voltage on the DC side of the inverter. It is preferred to use such a capacitor for providing a link for the alternating current component in the power supply, between the two DC supply lines. The capacitor connects the two DC supply lines, but the capacitor is separated from one of the two DC supply lines via the primary side of the transformer. Therefore, the overlaid alternating voltage can be decoupled from the DC supply lines and the voltage at the opposite sides of the bridges of the inverter is nearly constant. The capacitor is functioning as a short cut of the alternating voltage. An example will be described in more detail. Such a link enables the power supply to the secondary side of the transformer, when the inverter is not producing an alternating current, but the control device of the inverter still needs electric energy for operation. Therefore, it is preferred that the inverter comprises a capacitor having opposite connections for connecting the capacitor and wherein the opposite connections are connected to the first and second direct current line. The capacitor may be realized by one capacitor or by any combination of capacitors which are connected in parallel and/or in series to each other.

Also, inverters known in the art often comprise a reactor for damping or eliminating frequencies caused by the operation of the inverter. According to an embodiment of the invention, the reactor is used as the primary winding of the transformer. As a result, no additional reactor is needed and the costs of establishing the system are reduced. Furthermore, the electric properties of the inverter are not changed by an additional primary winding.

The conductor arrangement for producing the electromagnetic field may comprise three lines (each line for one phase of the alternating-current) extending in the direction of travel. However, each line preferably comprises sections which extend transversely to the direction of travel. As a result, each line may follow a serpentine-like path.

Preferably, each line follows the same serpentine-like path along the path of travel, wherein the lines are shifted in the direction of travel by one third of the distance between consecutive sections of the same line extending transversely to the direction of travel. Serpentine-like means that sections of the line which extend in the direction of travel are followed in each case by a section which extends transversely to the travel direction which in turn is followed again by a section which extends in the direction of travel.

Such lines with transversely extending the line sections produce—at each point in time while the alternating electric current is flowing through the line—a row of successive magnetic poles of an electromagnetic field, wherein the successive magnetic poles have alternating magnetic polarities. At a given point in time the alternating current produces a magnetic field having a magnetic field vector which is oriented in a first direction in a first region of the line, followed (in the direction of travel) by a second region of the line where the field vector of the magnetic field is oriented in the opposite direction of the first direction, followed by another region of the line where the magnetic field vector is oriented again in the first direction and so on. As a result, the field intensity sideways of the path of travel is very small, since the fields produced by the transversely extending line sections compensate each other.

BRIEF DESCRIPTION OF THE DRAWINGS

Embodiments and examples of the present invention will be described with reference to the attached figures. The figures show.

DETAILED DESCRIPTION OF THE INVENTION

Figure 1:
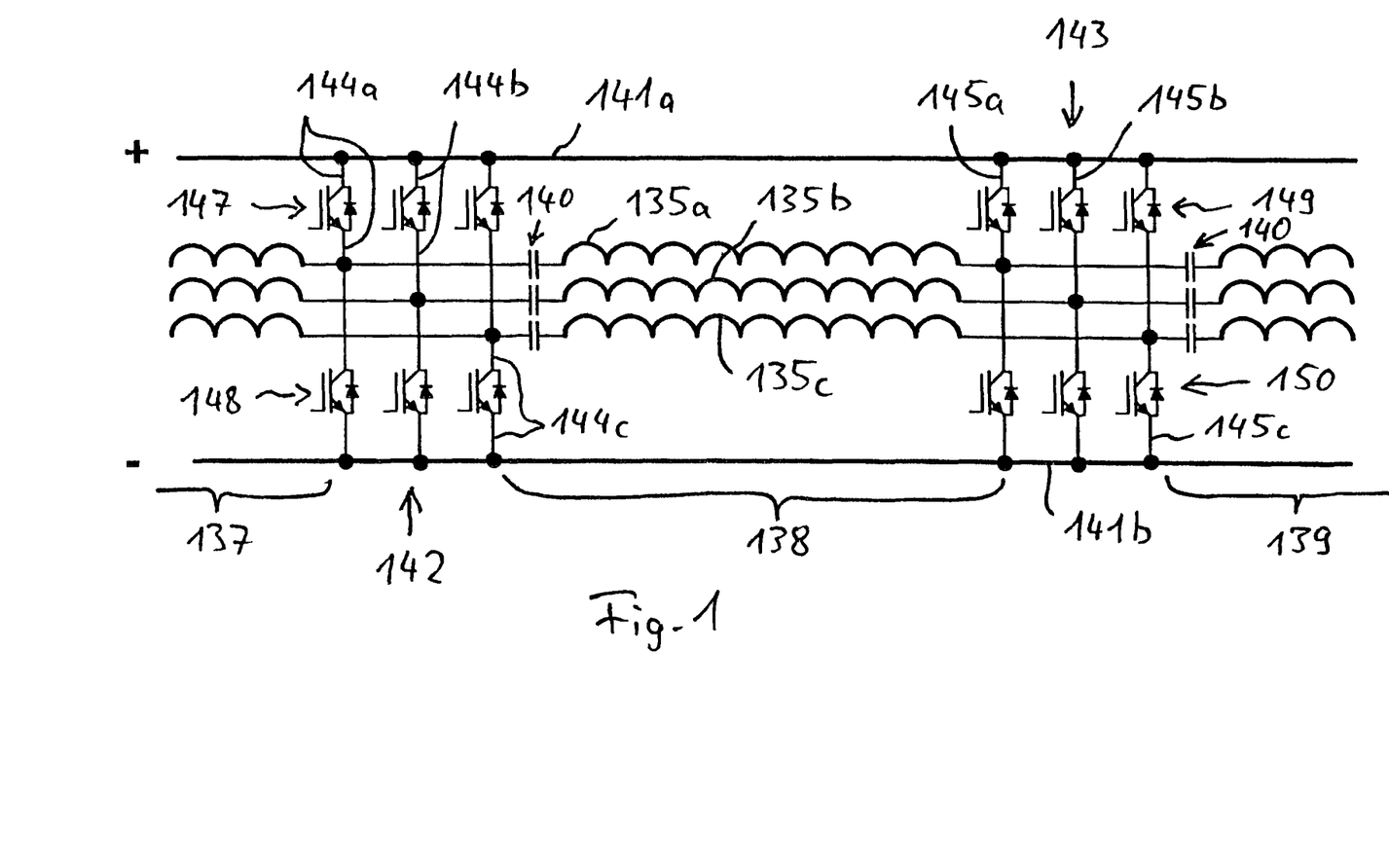
FIG. 1 an arrangement having segments for transferring electric energy to a vehicle, wherein the segments are connected to a DC power supply via inverters at interfaces between the segments, FIG. 2 schematically a rail vehicle travelling along a track with a plurality of consecutive segments, wherein an inverter is arranged at each interface between two consecutive segments, FIG. 3 Schematically an arrangement comprising consecutive segments, wherein the lines of the segments for carrying the phases of the alternating current are not connected in series to each other, FIG. 4 a constant current source for producing a constant alternating current in one of the consecutive segments and FIG. 5 a circuit diagram showing a three-phase inverter which is connected to the DC power supply.

FIG. 1 shows a circuit diagram. A row of consecutive segments 137, 138, 139 of an electric conductor arrangement for producing an electromagnetic field is partially shown in the figure. Only one segment is fully shown, namely segment 138. The segments 137, 138, 139 each comprise three phase lines 135a, 135b, 135c. Each phase line 135 of each segment 137, 138, 139 comprises at one end of the phase line 135 a capacity 140 for compensating the inductance of the phase line 135. As a result, the impedance is zero. Each phase line 135 is symbolized by a chain of semi-circles in order to indicate the inductance. However, the phase line may be a straight line, a serpentine-like line, a coil or any other kind of lines.

At the interfaces between the consecutive segments 137, 138, 139, each phase line 135 is connected to plus and minus potential of a DC power supply comprising DC lines 141a, 141b via in each case one switch 147, 148. The six switches at each interface are parts of an inverter. For example, phase line 135a is connected via connection 144a to plus potential (line 141a) and minus potential (line 141b). Within connection 144a, the switch between phase line 135a and plus potential is denoted by reference numeral 147 and the switch between the phase line 135a and minus potential is denoted by 148. The connections 144b, 144c of the phase lines 135b, 135c to plus and minus potential (lines 141a, 141b) are constructed in the same manner. This description applies to interface 142 between segment 137 and segment 138. At the interface between segment 138 and segment 139, the connections between the phase lines 135 and the DC supply line 141 are denoted by reference numerals 145a, 145b, 145c. The switches between the phase lines 135 and the plus potential of line 141a are denoted by 149 and the switches to the minus potential are denoted by 150.

Consequently, each interface 142, 143 can be connected and disconnected to/from the supply line 141 by operating switches 147, 148 or 149, 150. The switches 147, 148 constitute a first inverter, together with a control of the switches 147, 148 which is not shown in FIG. 1. In the same manner, switches 149, 150 and a corresponding control for controlling the switching operations of these switches constitute a second inverter at interface 143. During operation of the inverters, the switches of the inverter are repeatedly switched on and off to produce a desired alternating current at the interface 142, 143, i.e. at the end of one of the segments 137, 138, 139. For example, the connection 144a for connecting the DC supply line 141 to phase line 135a therefore comprises a series connection of switch 147 and switch 148 wherein a connection is made between phase line 135a and a contact point between the switches 147, 148.

Figure 2:
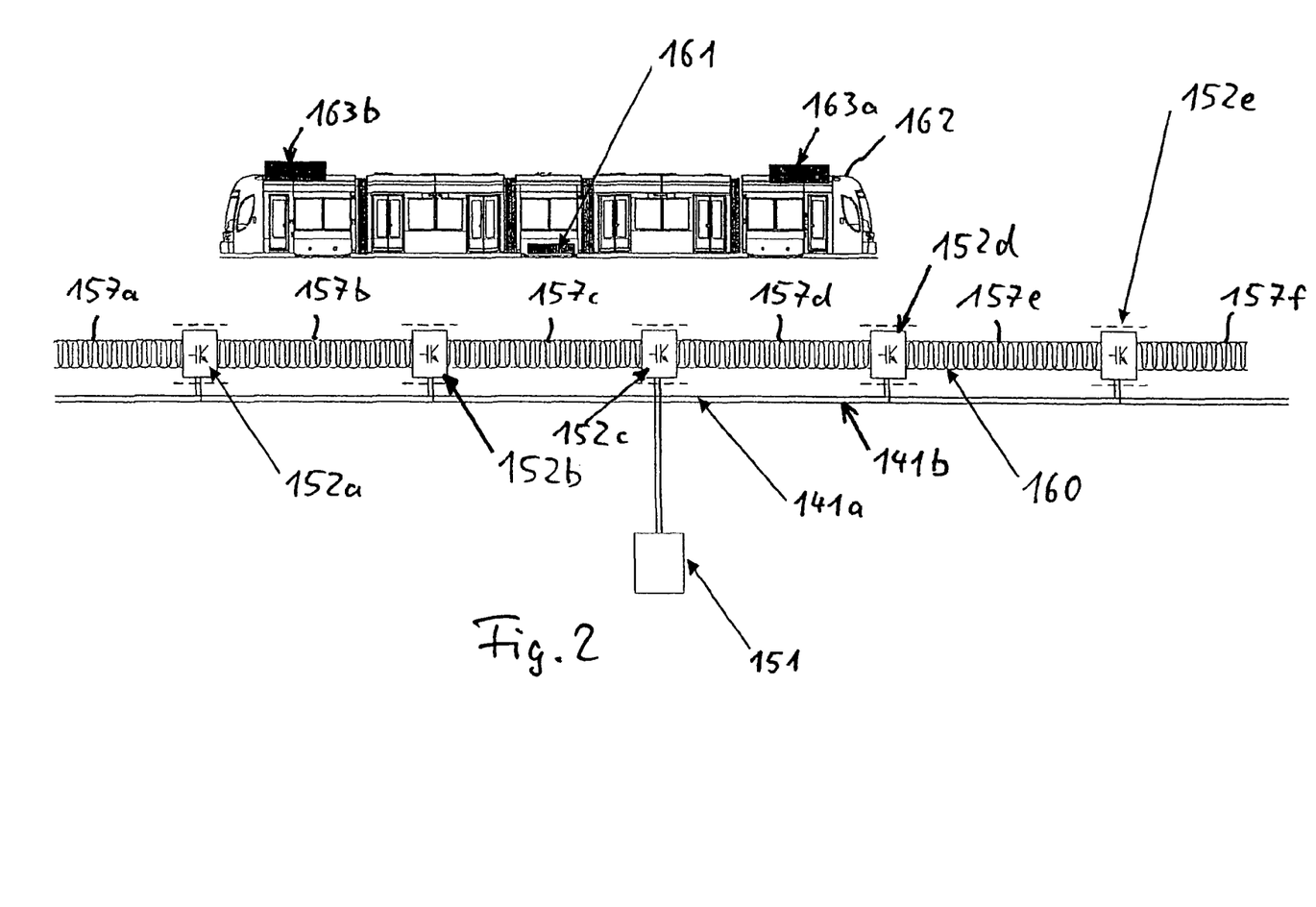

As shown in FIG. 2, a plurality of segments 147a to 147f may be arranged as consecutive segments of a conductor arrangement 160 along the path of travel of a vehicle 162. The vehicle 162 (e.g. a tram) may comprise at least one receiving device 161 for receiving the electromagnetic field produced by one or more than one of the segments 157. In the situation shown in FIG. 2, the receiving device 161 is located above segment 157c and at least this segment 157c is operated to produce an electromagnetic field and to provide energy to the vehicle. Furthermore, the vehicle may comprise energy storages 163a, 163b which may be used to operate the vehicle if not sufficient energy is received from the segments 157.

At each interface between two consecutive segments 157, an inverter 152a to 152e is provided. For example, the inverters 152 may be realized according to the circuit diagram of FIG. 1. The DC supply lines 141a, 141b are also shown in FIG. 2. They are connected to an energy source 151, such as a power station for producing a direct current.

Figure 3:
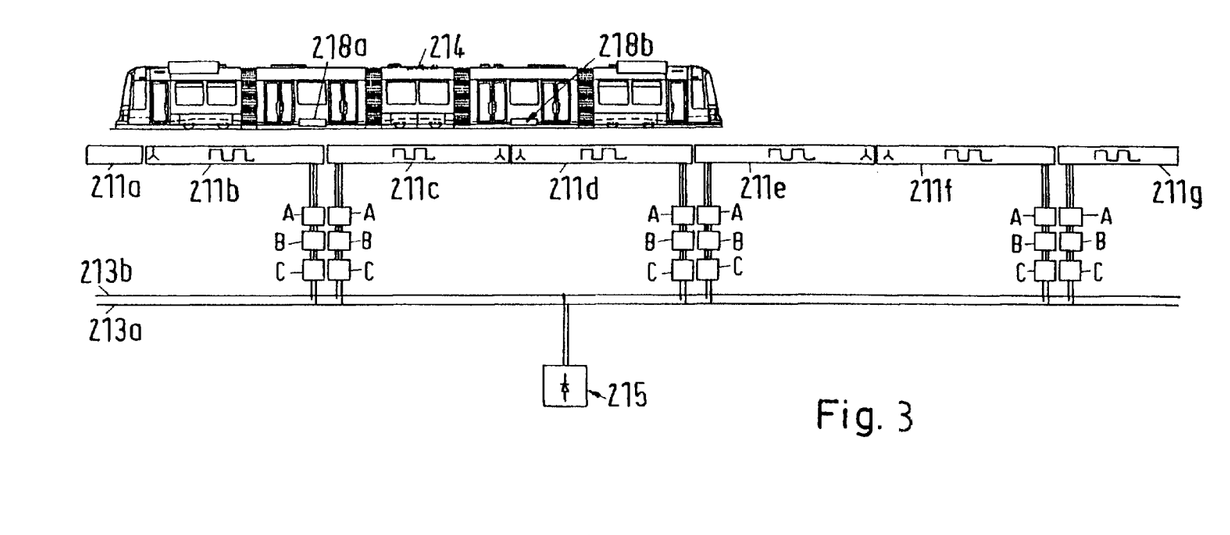

FIG. 3 shows a rail vehicle 214 at the top of the figure. The vehicle 214, for example a tram, comprises two receiving devices 218a and 218b for receiving the electromagnetic energy from segments 211 of the track. The figure shows at least parts of in total seven consecutive segments 211a-211g, although—in practice—there are usually much more consecutive segments. At the time which is depicted in FIG. 3, three of the segments, namely segments 211b, 211c and 211d are active, i.e. the lines of theses segments carry an alternating current thereby producing the electromagnetic field for transferring electromagnetic energy to the receiving devices 218 of the vehicle 214. Each of the segments comprises three lines and each of the line carries one of three phases of the alternating current while active.

Figure 4:
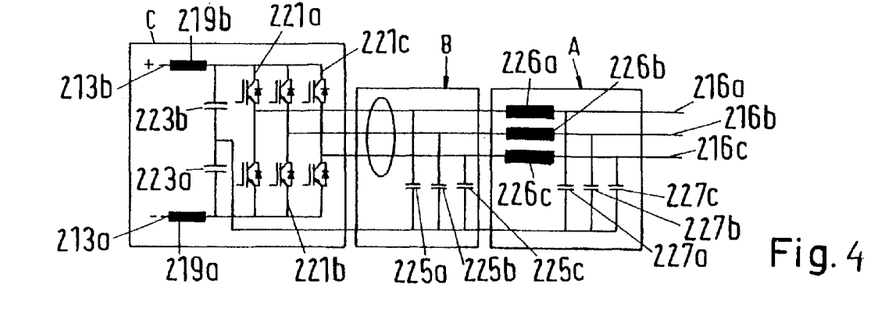

Each segment 211 is connected to a DC-supply line 213a, 213b via a constant current source arrangement A, B, C which is shown in FIG. 4. Arrangement A, B, C, can be housed in a single box, for example. As shown in FIG. 3, the DC-supply line 213 is connected to a supply station 215 which delivers the required DC-current to the DC-supply line 213. Optionally, supply station 215 may also comprise a device for modulating the DC voltage between supply lines 213. An example of a modulation device will be described with reference to FIG. 5.

The constant current source A, B, C comprises an inverter C having connections for connecting the DC-supply lines 213a, 213b. The connections are combined with an inductivity 219a, 219b. One side of the inductivity 219 is connected to the respective DC-line 213 and the other side of the inductivity 219 is connected to the three current paths 221a, 221b, 221c for producing the three phases of the alternating current. The inductivities serve to eliminate or at least to damp frequencies which are caused by the operation of the switches in paths 221.

Each current path 221 comprises two semiconductor power switches which are connected in series to each other and the alternating current lines are connected to a point in between the switches in the respective current path. Regarding the semiconductor switches and the current path the inverter may be a conventional three phase inverter and, therefore, further details are known to a skilled person.

However, there is a further connection between the secondary sides of the inductivities 219 which comprises two capacities 223a, 223b which are connected in series to each other. A point in between the capacities 223 is connected to each of the alternating current lines via in each case at least one first inductivity 225a, 225b, 225c. Furthermore, the point in between the two capacities 223 is connected to another point in each of the alternating current lines 216a, 216b, 216c via a second capacity 227a, 227b, 227c. These connection points are located an opposite side of an inductivity 226a, 226b, 226c in the alternating current line 216a, 216b, 216c with respect to the connection where the first capacity 225a, 225b, 225c is connected to the alternating current line 216a, 216b, 216c. The connections where the first capacities 225 are connected to the alternating current line 216 are shown in FIG. 4 within block B and the connections where the second capacities 227 are connected to the alternating current lines 116 are shown within block A in FIG. 4. Block A also comprises the inductivities 226.

Blocks A, B constitute a so called six-pole filter, including compensation capacitors which compensate for the inductivities of the lines in the segments which produce the primary side electromagnetic field.

When operated, i.e. while the semiconductor switches of inverter C are repeatedly switched on and off, the constant current source produces an alternating current having a constant effective mean value independent of the power which is thereby produced within the segment 211 and is transferred to the receiving devices 218 of the vehicle 214.

Figure 5:
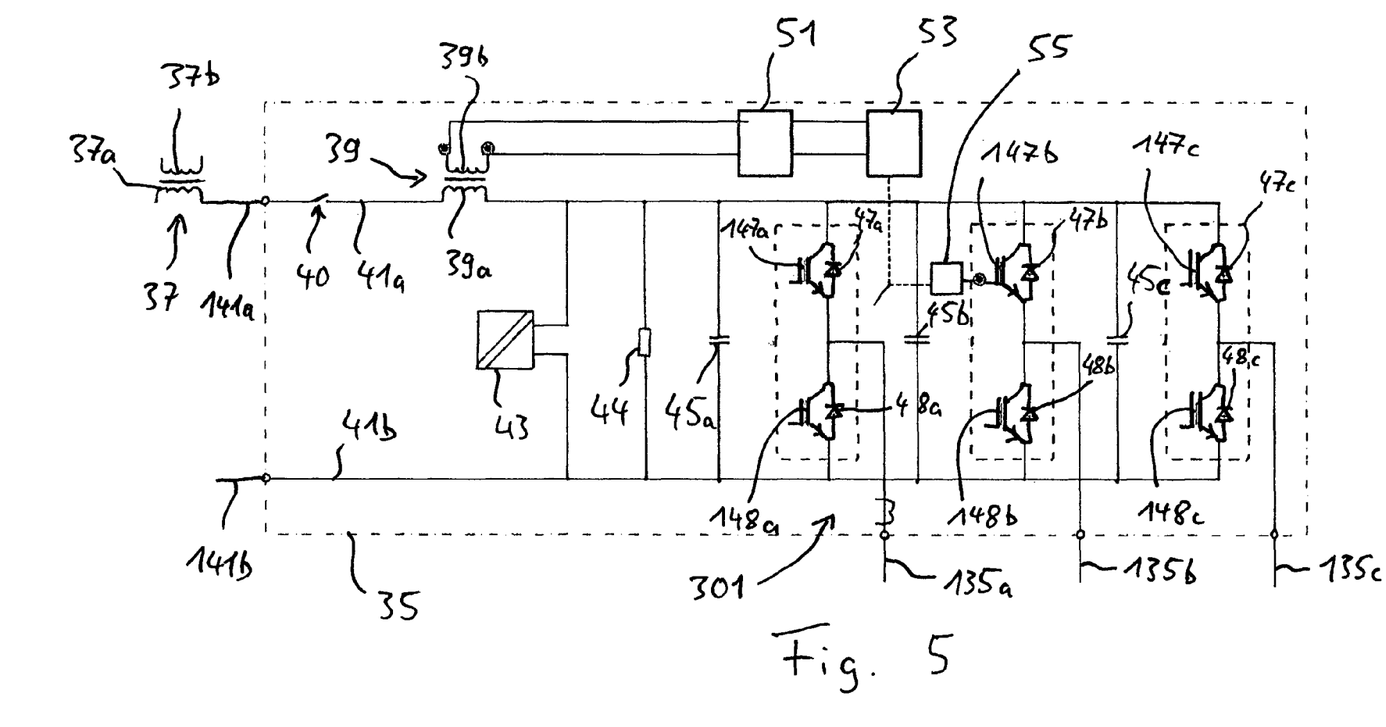

FIG. 5 shows a module 35 which comprises a three-phase inverter 301 and some other circuit components. A first direct current line 41a of the module 35 is connected to a first direct current supply line 141a of a DC power supply. A second direct current line 41b of module 35 is connected to the second direct current supply line 141b of the direct current supply.

As schematically shown in the top left region of FIG. 5, the first direct current supply line 141a is connected to the secondary winding 37a of a first transformer 37 which is used to modulate the direct voltage between the direct current supply lines 141 at a pre-determined modulation frequency. In order to produce the corresponding overlaid alternating voltage between the direct current supply lines 141a, 141b, the first transformer 37 comprises a primary winding 37b which may be connected to an alternating current source which is producing an alternating current at the pre-determined modulation frequency. Such an alternating current source may be a frequency generator, the frequency of which can be adapted. The voltage at the secondary winding 37a is determined by the voltage across the primary winding 37b and the relation of the windings of the transformer. Therefore, the voltage of the alternating current source may be adaptable as well.

The first direct current line 41a of module 35 comprises the primary winding 39a of a second transformer 39 which is part of the module 35. This second transformer 39 is used to decouple the electric energy from the direct current power supply which is needed to operate the inverter. Other than shown in FIG. 5, the first transformer and the second transformer do not have to be connected to each other directly. Rather, one of the transformers may be connected to the first direct current supply line and the other transformer may be connected to the second direct current supply line.

The first and second direct current lines 41a, 41b of the module 35 are connected to each other via a resistor 44 and via capacitors 45a, 45b, 45c, forming a capacitance between the first and second direct current lines 41a, 41b. The resistor 44 is provided for safety reasons. The high-Ohmic resistance of the resistor 44 allows for a slow equalization of the different electric potentials of direct current lines 41 if module 35 is disconnected from the DC power supply, e.g. by opening switch 40 in line 41a.

Capacitor 45 is used to smooth fluctuations between the electric potential across resistor 44. Such fluctuations are undesired, since the DC voltage across the series connections of in each case two switches 147, 148 should be constant.

FIG. 5 shows a specific embodiment having a preferred feature according to the present invention which may be realized in other specific embodiments as well. According to this feature, the capacity is connected to the direct current power supply via the primary winding of the second transformer which is used to decouple the energy from the direct current power supply. This means that the overlaid alternating voltage which exists in the DC power supply (between lines 141a, 141b in the example of FIG. 5) is at least partly eliminated by the decoupling of the electric energy performed by the second transformer (39 in FIG. 5). In other words, the capacitor 45 produces a short circuit for the alternating voltage.

The function and operation of the semiconductor switches 147, 148 may be similar or identical to the arrangement shown in FIG. 1 and, therefore, will not be described again here. The alternating current lines 135a, 135b, 135c are connected to a point in between the series connection of the semiconductor switches 147a, 148a; 147b, 148b; 147c, 148c, respectively. A free-wheeling diode 47, 48 is connected antiparallel wise to each of the semiconductor switches 147, 148.

However, further details of the inverter are shown in FIG. 5. Also representing the corresponding control devices of the other semiconductor switches, a gate drive unit 55 is shown which is connected to the gate of semiconductor switch 147b for driving the currents which are necessary to change the gate charge in order to switch the semiconductor switch 147d. As indicated by a dotted line, gate drive unit 45 is connected to a drive control unit 53 which controls the operation of all gate drive units of semiconductor switches 147, 148. The energy which is needed to operate the drive control unit 53 and optionally as well the energy which is needed to operate the gate drive units is provided by circuitry 51. This circuitry 51 is connected to the secondary winding 39b of the second transformer 39. Circuitry 51 comprises the electric and/or electronic components to adapt the alternating voltage at the secondary winding 39b to the needs of drive control unit 53 and/or drive units 54.

FIG. 5 also shows a measurement unit 53 for measuring, for example, current and voltage. The measurement values may be used by the drive control unit 53 for controlling the gate drive units 54.

The invention claimed is:

1. A system for transferring electric energy to a vehicle, wherein
   the system comprises an electric conductor arrangement for producing an alternating electromagnetic field and for thereby transferring the energy to the vehicle,
   the conductor arrangement comprises a plurality of consecutive segments, wherein the segments extend along the path of travel of the vehicle,
   the system comprises a direct current supply for conducting electric energy to the segments, wherein the direct current supply comprises a first and a second direct current line, the first direct current line being operated at a different electric potential than the second direct current line,
   each segment is connected to the direct current supply via at least one inverter which is adapted to invert a direct current carried by the direct current supply to an alternating current carried by the segment,
   the system comprises a modulation device for modulating the electric potential of at least one of the first and second direct current line using a predetermined modulation frequency, thereby producing a direct voltage having an overlaid voltage alternating with the modulation frequency, and
   at least some of the inverters comprise a transformer having a primary and a secondary winding, wherein the primary winding is connected to the first or second direct current line, so that the direct current flows through the primary winding and wherein the secondary winding is connected to a power supply arrangement adapted to provide electric energy for operating the inverter.

2. The system of claim 1, wherein the conductor arrangement comprises at least one alternating current line, and wherein each alternating current line is adapted to carry one phase of an alternating electric current.

3. The system of claim 2, wherein each segment comprises one section of each of the at least one alternating current line.

4. The system of claim 2, wherein corresponding sections for carrying the same phase of the alternating current in consecutive segments are electrically separated from each other.

5. The system of claim 1, wherein the inverter comprises phase switches adapted to repeatedly connect and disconnect the direct current supply with/from the alternating current line of a phase, thereby producing the alternating current, wherein the inverter comprises a control device for controlling the operation of the phase switches and wherein the control device is connected to the power supply arrangement for receiving electric energy for operation.

6. The system of claim 1, wherein the inverter comprises a capacitor having opposite connections for connecting the capacitor and wherein the opposite connections are connected to the first and second direct current line.

7. The system of claim 1, wherein the primary winding of the transformer is a reactor for damping or eliminating frequencies caused by the operation of the inverter.

8. The system of claim 1, wherein the vehicle is a track bound vehicle.

9. A method of transferring electric energy to a vehicle, wherein
   an electric conductor arrangement is operated to produce an alternating electromagnetic field and for thereby transferring the energy to the vehicle,
   the conductor arrangement comprises a plurality of consecutive segments, wherein the segments extend along the path of travel of the vehicle, wherein the segments are operated separately, at least partly and/or at least occasionally,
   electric energy for transfer to the vehicle is conducted to the segments via a direct current supply, wherein the direct current supply comprises a first and a second direct current line, the first direct current line being operated at a different electric potential than the second direct current line,
   the electric energy is conducted from the direct current supply via at least one inverter to each of the segments, the inverter being adapted to invert a direct current carried by the direct current supply to an alternating current carried by the segment,
   the electric potential of at least one of the first and second direct current line is modulated with a predetermined modulation frequency, thereby producing a direct voltage having an overlaid voltage alternating with the modulation frequency, and
   at least some of the inverters comprise a transformer having a primary and a secondary winding, wherein the primary winding is connected to the first or second direct current line so that the direct current flows through the primary winding and wherein the transformer is used to provide electric energy from the secondary winding for operating a control device of the inverter.

10. The method of claim 9, wherein at least two consecutive segments are operated at the same time, and wherein corresponding sections of lines for carrying the same phase of the alternating current in the consecutive segments are connected in series to each other.

11. The method of claim 9, wherein corresponding sections of lines for carrying the same phase of the alternating current in the consecutive segments are electrically separated from each other.

12. The method of claim 9, wherein phase switches of the inverter are controlled by the control device to repeatedly connect and disconnect the direct current supply with/from the alternating current line of a phase, thereby producing the alternating current, and wherein the control device is provided with electric energy from the secondary winding for operation of the control device.

13. The method of claim 9, wherein the inverter comprises a capacitor having opposite connections for connecting the capacitor, wherein the opposite connections are connected to the first and second direct current line, and wherein the capacitor is also used to smooth fluctuations of the direct voltage between the first and second direct current line.

14. The method of claim 9, wherein the primary winding of the transformer is also used as a reactor for damping or eliminating frequencies caused by the operation of the inverter.

15. The method of claim 9, wherein the vehicle is a track bound vehicle.

\* \* \* \* \*